United States Patent
Butala et al.

(10) Patent No.: US 10,517,034 B2
(45) Date of Patent: *Dec. 24, 2019

(54) UPLINK-AWARE SERVING CELL SELECTION

(71) Applicant: Corning Optical Communications LLC, Charlotte, NC (US)

(72) Inventors: Amit Butala, Sunnyvale, CA (US); Yashwanth Hemaraj, Milpitas, CA (US); Peter Worters, San Carlos, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,725

(22) Filed: Mar. 14, 2018

(65) Prior Publication Data

US 2018/0206172 A1    Jul. 19, 2018

Related U.S. Application Data

(63) Continuation of application No. 14/031,596, filed on Sep. 19, 2013, now Pat. No. 9,924,435.

(60) Provisional application No. 61/703,181, filed on Sep. 19, 2012.

(51) Int. Cl.
  *H04W 36/00* (2009.01)
  *H04W 36/30* (2009.01)

(52) U.S. Cl.
  CPC .................................. *H04W 36/30* (2013.01)

(58) Field of Classification Search
  CPC ........... H04W 36/30; H04W 36/00835; H04W 24/02
  See application file for complete search history.

(56) References Cited

U.S. PATENT DOCUMENTS

| | | | |
|---|---|---|---|
| 5,799,254 A | 8/1998 | Karmi et al. | |
| 6,631,263 B1 | 10/2003 | Corkery | |
| 6,980,511 B1 | 12/2005 | Li et al. | |
| 8,897,259 B2 * | 11/2014 | Kim | H04W 36/08 370/331 |
| 2002/0137457 A1 | 9/2002 | Nivens et al. | |
| 2004/0266434 A1 | 12/2004 | Lehtinen et al. | |
| 2007/0173279 A1 * | 7/2007 | Kuroda | H04W 52/12 455/522 |
| 2008/0096566 A1 | 4/2008 | Brunner et al. | |
| 2009/0010222 A1 * | 1/2009 | Jechoux | H04W 36/30 370/331 |
| 2009/0275337 A1 * | 11/2009 | Maeda | H04W 36/18 455/442 |
| 2010/0069064 A1 | 3/2010 | Hannu et al. | |
| 2010/0118761 A1 | 5/2010 | Wu et al. | |

(Continued)

OTHER PUBLICATIONS

IEEE, "Handoff criteria for personal communication networks",Conference on Year: 1994, pp. 1297-1301 vol. 3.

*Primary Examiner* — Lan-Huong Truong
(74) *Attorney, Agent, or Firm* — C. Keith Montgomery (57) ABSTRACT

An example method comprises receiving an event notification from a cell in a current set of a user equipment, the event notification indicating an uplink signal strength from the user equipment to the cell relative to a threshold; and designating the cell as being either a viable candidate or not a viable candidate to be a serving cell based on the uplink signal strength relative to the threshold.

17 Claims, 8 Drawing Sheets

(56) References Cited

U.S. PATENT DOCUMENTS

| | | | |
|---|---|---|---|
| 2011/0130099 A1* | 6/2011 | Madan | H04W 72/1226 455/63.1 |
| 2011/0188472 A1 | 8/2011 | Jeon et al. | |
| 2011/0250891 A1 | 10/2011 | Zou et al. | |
| 2012/0028676 A1 | 2/2012 | He | |
| 2012/0057544 A1 | 3/2012 | Xu et al. | |
| 2012/0069756 A1* | 3/2012 | Ji | H04W 36/0016 370/252 |
| 2012/0155429 A1* | 6/2012 | Lin | H04W 36/0005 370/331 |

* cited by examiner

UPLINK-AWARE SERVING CELL SELECTION

RELATED APPLICATIONS

This application is a continuation application of and claims priority to U.S. patent application Ser. No. 14/031,596, entitled "UPLINK-AWARE SERVING CELL SELECTION," filed on Sep. 19, 2013, which claims priority under 35 U.S.C. § 119(e) to U.S. Provisional Patent Application Ser. No. 61/703,181, entitled "METHOD AND APPARATUS FOR UPLINK-AWARE SERVING CELL SELECTION," filed Sep. 19, 2012, both of which are hereby incorporated by reference in their entireties and for all purposes.

TECHNICAL FIELD

The present invention relates to communication networks, and more particularly, to procedures for selection of a serving cell in communication network.

BACKGROUND

Cellular networks have traditionally been deployed in a homogenous manner. For example, a typical cellular network may comprise a plurality of macrocells that are fairly uniform in the coverage areas they support. In the case of $3^{rd}$ Generation Partnership Project (3GPP) Universal Mobile Telecommunications System (UMTS) networks, each of these macrocells is connected to a Radio Network Controller (RNC). The RNC generally effectuates radio resource management, as well as some mobility management functionality, such as facilitating handover, maintaining device state, and supporting layer 2 data-plane protocols.

There are some exceptions to the uniform deployment paradigm described above, such as picocell and femtocell networks that are deployed in conjunction with an overarching macrocellular network. That is, picocells and femtocells, which may be considered small cellular base stations or access points, connect to a service provider's core network via broadband connections, allowing the macrocellular network to be extended either for capacity augmentation or for extending the coverage (e.g., indoors). These picocells and femtocells may be deployed in the same frequency channel as the macrocellular network, in which case they are referred to as co-channel deployments, or in a different frequency channel, in which case they are referred to as dedicated channel deployments.

The overlapping nature of the cells, whether in a macrocell network or in a small-cell network, facilitates handover of a mobile device from one cell to another. A soft handover occurs when a mobile device is simultaneously connected to multiple cells. When signal quality from one of the current cells connected to the UE degrades and another cell in the neighborhood of the mobile device offers a better option, a soft handover can occur to the another cell.

SUMMARY

Various aspects of examples of the invention are set out in the claims.

According to a first aspect of the present invention, a method comprises receiving an event notification from a cell in a current set of a user equipment, the event notification indicating an uplink signal quality from the user equipment to the cell being below a predetermined threshold; and designating the cell as being not a viable candidate to be a serving cell.

According to a second aspect of the present invention, a method comprises receiving an event notification from a cell in a current set of a user equipment, the event notification indicating an uplink signal quality from the user equipment to the cell being above a predetermined threshold; and designating the cell as being a viable candidate to be a serving cell.

According to a third aspect of the present invention, an apparatus comprises a processor; and a memory including computer program code, the memory and the computer program code configured to, with the at least one processor, cause the apparatus to perform at least the following: receiving an event notification from a cell in a current set of a user equipment, the event notification indicating an uplink signal quality from the user equipment to the cell being below a predetermined threshold; and designating the cell as being not a viable candidate to be a serving cell.

According to a fourth aspect of the present invention, an apparatus comprises a processor; and a memory including computer program code, the memory and the computer program code configured to, with the at least one processor, cause the apparatus to perform at least the following: receiving an event notification from a cell in a current set of a user equipment, the event notification indicating an uplink signal quality from the user equipment to the cell being above a predetermined threshold; and designating the cell as being a viable candidate to be a serving cell.

According to a fifth aspect of the present invention, a computer program product is embodied on a computer-readable non-transitory medium and comprises computer code for receiving an event notification from a cell in a current set of a user equipment, the event notification indicating an uplink signal quality from the user equipment to the cell being below a predetermined threshold; and designating the cell as being not a viable candidate to be a serving cell.

According to a sixth aspect of the present invention, a computer program product is embodied on a computer-readable non-transitory medium and comprises computer code for receiving an event notification from a cell in a current set of a user equipment, the event notification indicating an uplink signal quality from the user equipment to the cell being above a predetermined threshold; and designating the cell as being a viable candidate to be a serving cell.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF CERTAIN EMBODIMENTS

During a soft handover, a user equipment (UE) is connected to multiple cells simultaneously. The collection of cells to which the UE is connected is referred to as the active set. Connection to multiple cells provides several benefits. For example, the UE instantaneous transmit power, and hence the total uplink interference in the system, is reduced since uplink power control works to ensure that the received signal from the UE at the best cell meets a certain quality target.

Figure 1A:
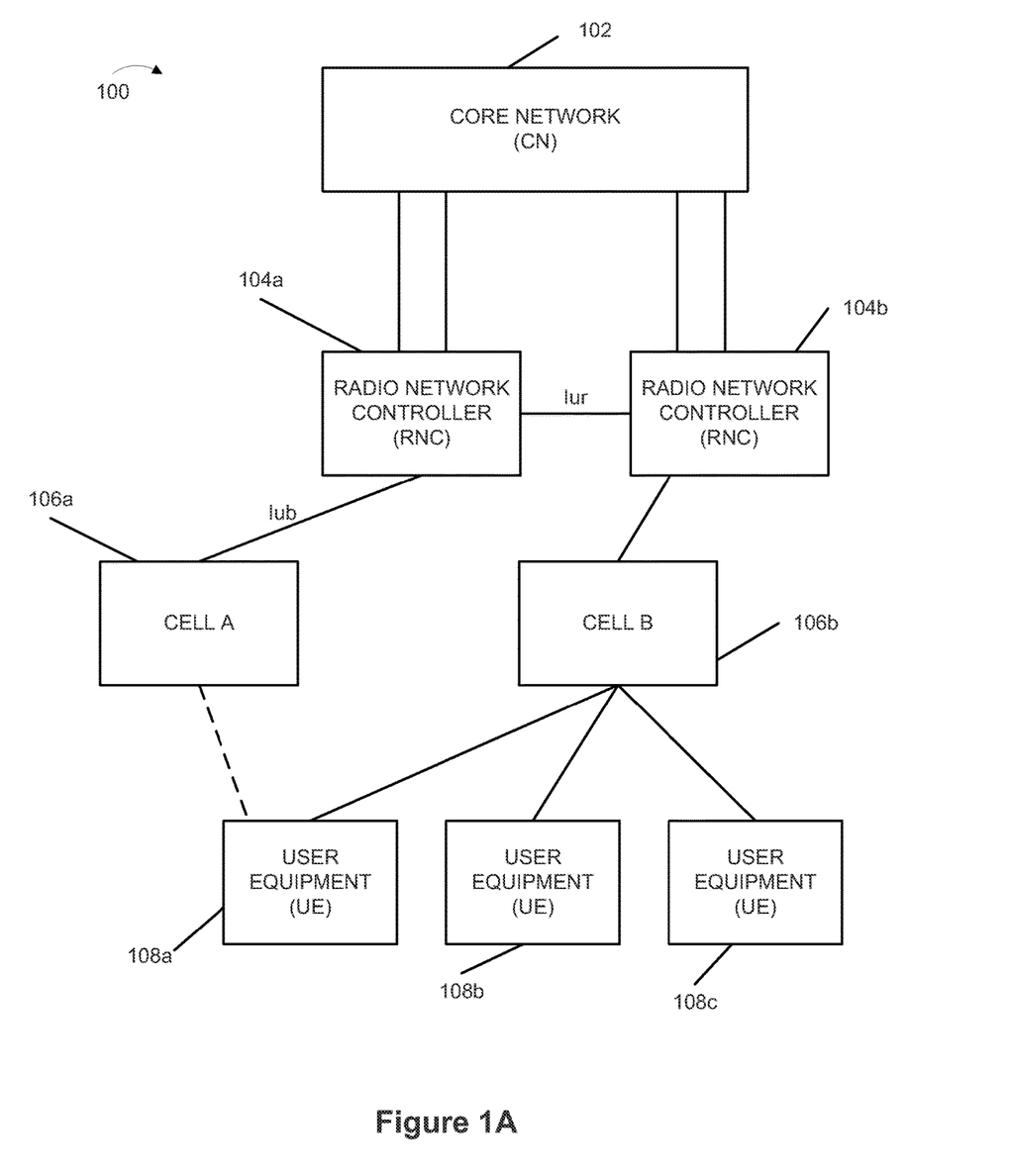
FIG. 1A illustrates an example network within which certain embodiments can be implemented.

Referring now to FIG. 1A, an example diagram of a radio network 100, such as a Universal Mobile Telecommunication System (UMTS) Terrestrial Radio Access Network (UTRAN), that can accommodate the various disclosed embodiments, is illustrated. The network 100 that is depicted in FIG. 1A comprises a Core Network (CN) 102, one or more Radio Network Controllers (RNC) 104a that are in communication with a plurality of cells 106a and 106b (or base stations or radio nodes) and other RNCs 104b. The communication between the RNC 104a and RNC 104b may be, for example, through a standard-based Iur interface. Each cell 106a, 106b is in communication with one or more UEs 108a, 108b and 108c. There is one serving cell, cell 106b, controlling the serving radio link assigned to each UE 108a, 108b and 108c. However, as illustrated in FIG. 1A with a dashed line, a UE 108a may be in communication with more than one cell or base station. For example, a neighboring cell may communicate with one or more UEs of the current serving cell during handoffs and/or to provide overload indications. While FIG. 1A depicts an exemplary UMTS radio network, the disclosed embodiments may be extended to operate with other systems and networks such as CDMA2000, WiMAX, LTE and the like.

Figure 1B:
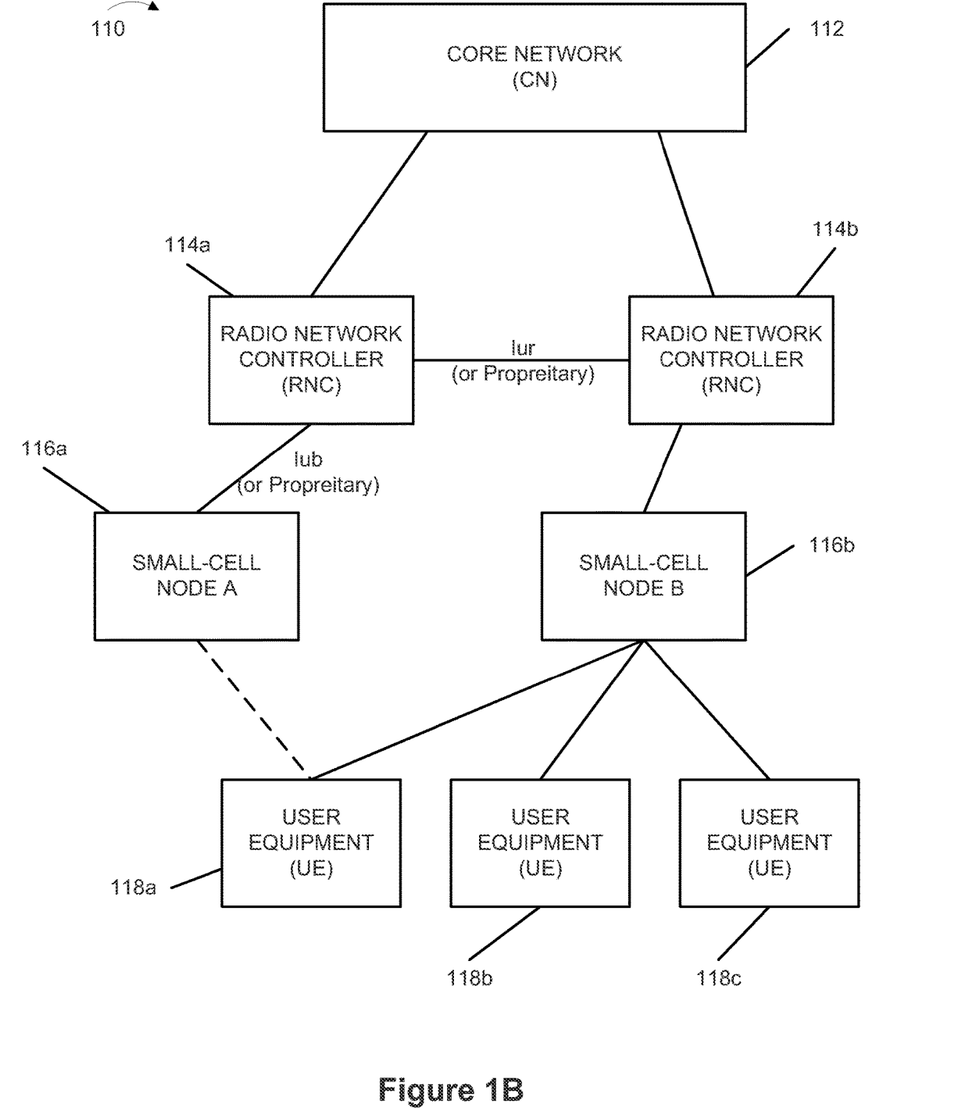
FIG. 1B illustrates another example network within which certain embodiments can be implemented.

Further, while FIG. 1A illustrates a macrocell network, certain embodiments may be implemented in a small-cell network. Referring now to FIG. 1B, an example diagram of a network 110 that can accommodate the various disclosed embodiments, is illustrated. The network 110 that is depicted in FIG. 1B comprises a Core Network (CN) 112, one or more Radio Network Controllers (RNC) 114a that are in communication with a plurality of small-cell nodes 116a and 116b and other RNCs 114b. In the small-cell environment, the communication between the plurality of small-cell nodes 116a, 116b may be, for example, managed by the controlling RNCs 114a, 114b through a standard-based Iur interface or a proprietary interface. Each small-cell node 116a, 116b is in communication with one or more UEs 118a, 118b and 118c. In the small-cell environment, the RNC's may be local network gateways. As with the network illustrated in FIG. 1A, in the network of FIG. 1B, there is one serving cell, cell 116b, controlling the serving radio link assigned to each UE 118a, 118b and 118c. However, as illustrated with a dashed line, a UE 118a may be in communication with more than one small-cell node. For example, a neighboring small-cell node may communicate with one or more UEs of the current small-cell node during handoffs and/or to provide overload indications. For purposes of the present disclosure, the term "cell" is used to refer to both a macrocell network cell (e.g., a base station or a NodeB) and a small-cell network cell (e.g., a small-cell node).

Figure 2:
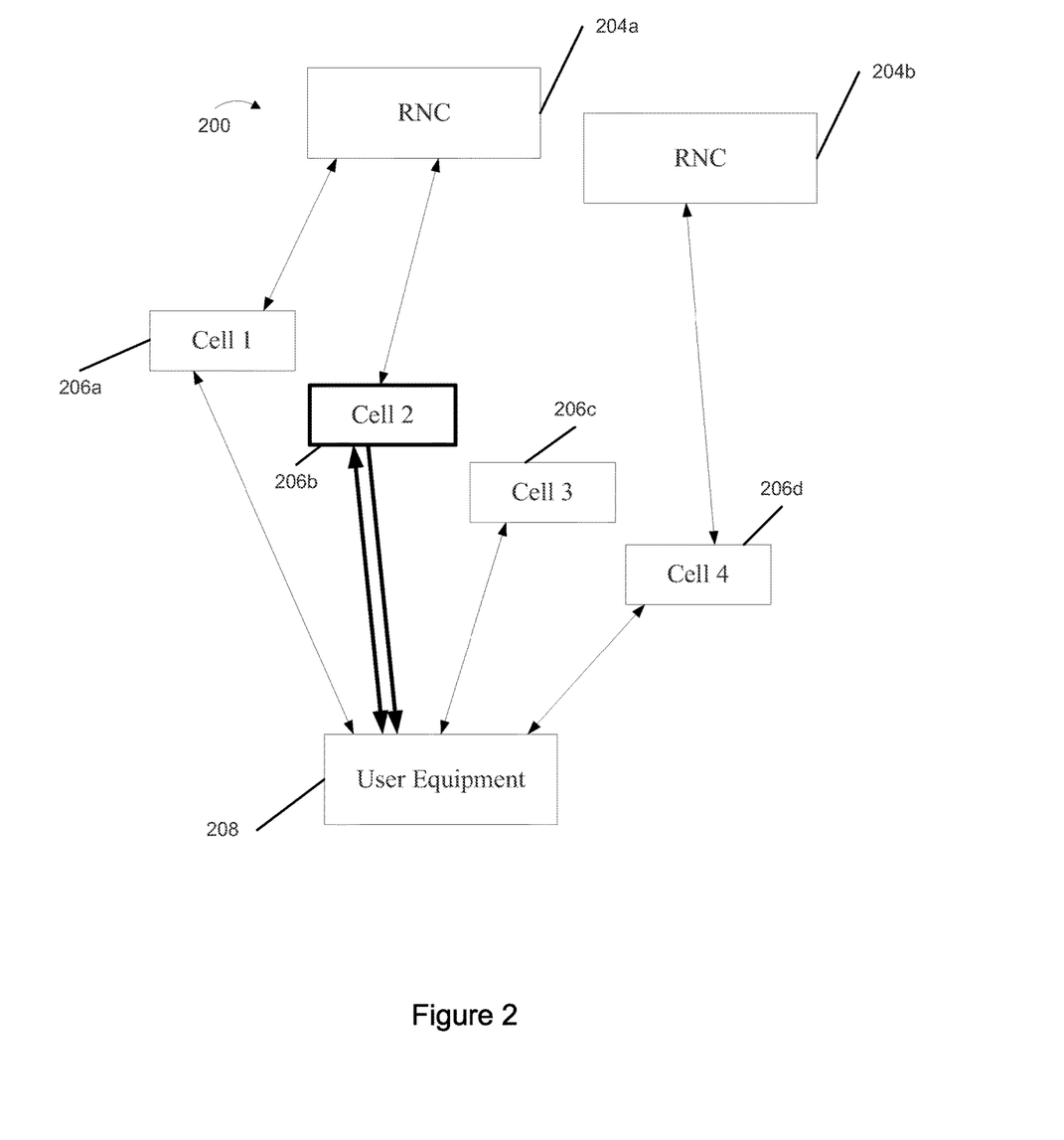
FIG. 2 illustrates an example soft handover arrangement in accordance with the disclosed embodiments.

Referring now to FIG. 2, the operation of a particular UE is illustrated in the networks described above with reference to FIGS. 1A and 1B. In the arrangement 200 of FIG. 2, RNCs 204a and 204b are in communication with a plurality of cells 206a-d. The UE 208 is connected to each of the cells 206a-d. The RNCs 204a, 204b may be in communication with additional cells which are not in communication with the UE 208 and are, therefore, not illustrated in FIG. 2.

As noted above, the cells to which the UE 208 is connected comprise the active set of the UE 208. In the embodiment illustrated, the active set may include cells that are connected to different RNC's, as illustrated in the example of FIG. 2. The cells in the active set are determined based on the downlink signal quality measured by the UE for all the cells in the vicinity of the UE. In UMTS, the UE reports Events 1A and Events 1C to include cells in the active set. All the cells in the active set of the UE measure the uplink signal quality from the UE and may independently signal power control commands such that the minimum signal-to-noise requirement is satisfied on at least one of the cells in the active set. This is called OR-OF-DOWNs and may result in the uplink SNR being even lower on some other cells in the active set. The minimum SNR may be statically provisioned or continually updated by the RNC in order to achieve a desired block error rate on the uplink from the UE.

Only one of the cells in the active set is the serving cell for the UE 208. In the illustrated of FIG. 2, the serving cell is the cell 206b. In High Speed Downlink Packet Access (HSDPA), the serving cell typically corresponds to the cell with the strongest downlink signal, as measured by the UE. In UMTS, this is typically indicated by the UE reporting of the event 1D for a specific cell. The serving cell schedules HSDPA data for the UE 208 and listens to the uplink high-speed dedicated physical control channel (HS-DPCCH), which carries feedback information indicating whether the downlink data has been correctly decoded by the UE, and channel quality measurements used for scheduling decisions.

As noted above, the serving cell is generally selected based on downlink signal strength. In certain situations, the uplink signal quality can become degraded. For example, the serving cell may not have the dominant uplink receive path within the active set of the UE 208. This can result in poor HS-DPCCH decode performance leading to significantly degraded HSDPA throughput and possibly call drops.

In accordance with certain embodiments, the degradation of the uplink on the service cell may be mitigated by allowing the RNC to take uplink signal quality into account when selecting the serving cell. Referring again to FIG. 2, as noted above, the UE 208 is connected to each cell in its active set, cells 206a-d, with cell 206b being the serving cell. In FIG. 2, the connection between the UE 208 and the serving cell 206b is illustrated by double arrows to indicate that the serving cell 206b communicates both legacy R99 and HSPA traffic with the UE 208.

The other cells in the active set of the UE 208, cells 206a, 206c and 206d, continuously measure the received uplink channel quality from the UE 208 and signal power control values, among other things, to the UE. Thus, in FIG. 2, the non-serving cells 206a, 206c, 206d are shown connected to the UE 208 by a single arrow indicating that these cells are not the serving cell.

Each cell in the active set of the UE 208 reports certain events to the RNC 204, as indicated by the arrows between certain cells (e.g., cells 206a, 206b, 206d) and the RNC 204. The events are associated with changes in the uplink signal quality above or below certain thresholds.

Traditionally, per UMTS specifications only the acquisition and loss of acquisition of the link is indicated by the cell to the RNC via the messages RL_RESTORE and RL_FAILURE. An RL_RESTORE is indicated when the cell has acquired the timing of the uplink cell and can detect the uplink pilot channel. This state has been identified as "insync". Likewise an RL_FAILURE is an indication of exit from "insync" to "outsync". However, further state enhancements are possible. This is illustrated by way of example in FIG. 3A.

Figure 3A:
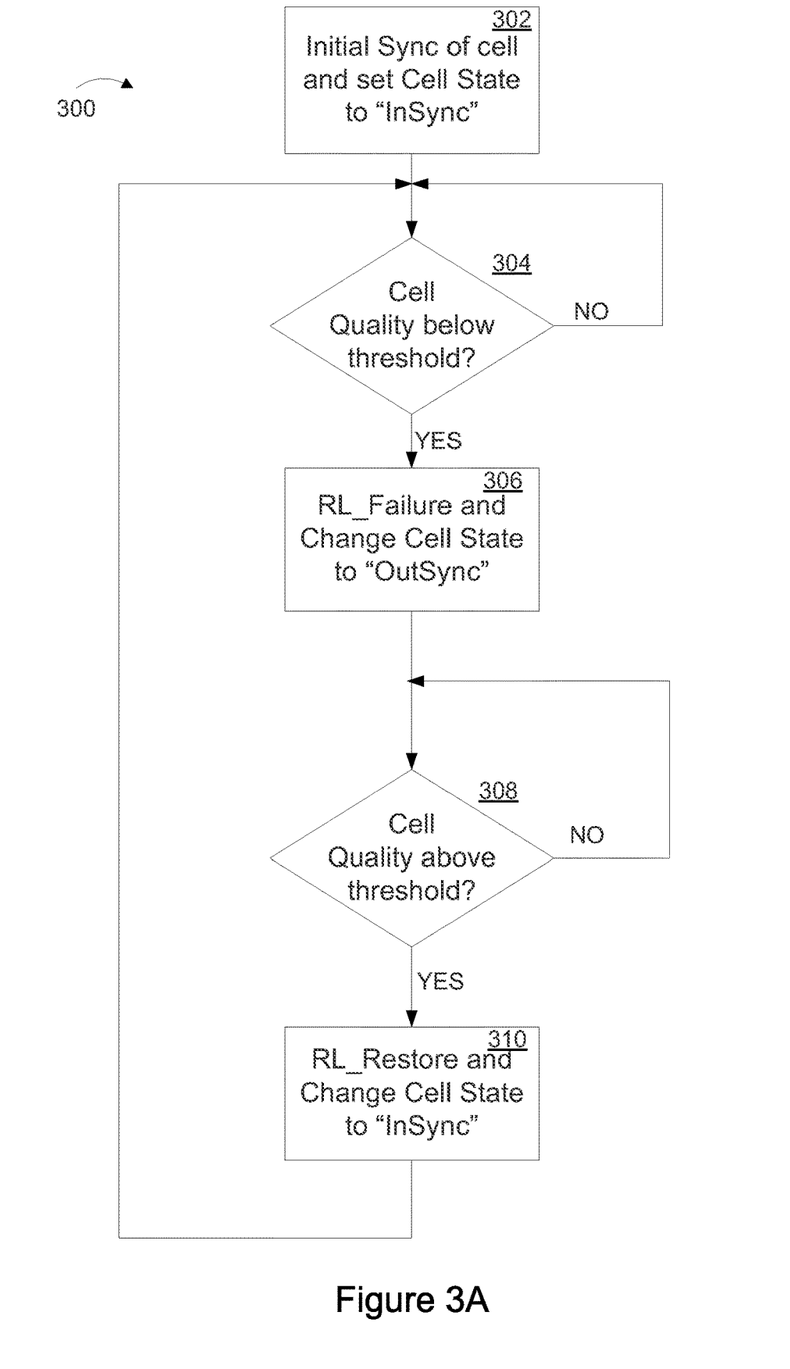
FIGS. 3A and 3B illustrate example methods in accordance with certain embodiments.

In FIG. 3A, at block 302, a new radio link is configured, and an initial synchronization is performed. Based upon a satisfactory signal quality, the state for the cell for the particular UE is set to "inSync", which includes the cell in the current active set of the UE. If the signal quality of the cell drops below a threshold (block 304), an RL_Failure results in the state of the cell being changed to "outSync", or out of the current active set of the UE (block 306). In certain embodiments, the threshold may be a predetermined threshold. In other embodiments, the threshold may be dynamically determined in accordance with, for example, an algorithm or variable parameters. An RL_Failure may occur, for example, if the signal quality is below a predetermined level for several consecutive frames. The RNC may use an "outSync" indication to remove a cell from the active set of the UE.

If the signal quality of the cell is above a threshold (block 308), an RL_Restore results in the state of the cell being changed to "inSync" again (block 310), in which case the RNC may continue to retain the cell in the active set of the UE. As noted above, the threshold may be a predetermined threshold or may be dynamically determined in accordance with, for example, an algorithm or variable parameters.

Figure 3B:
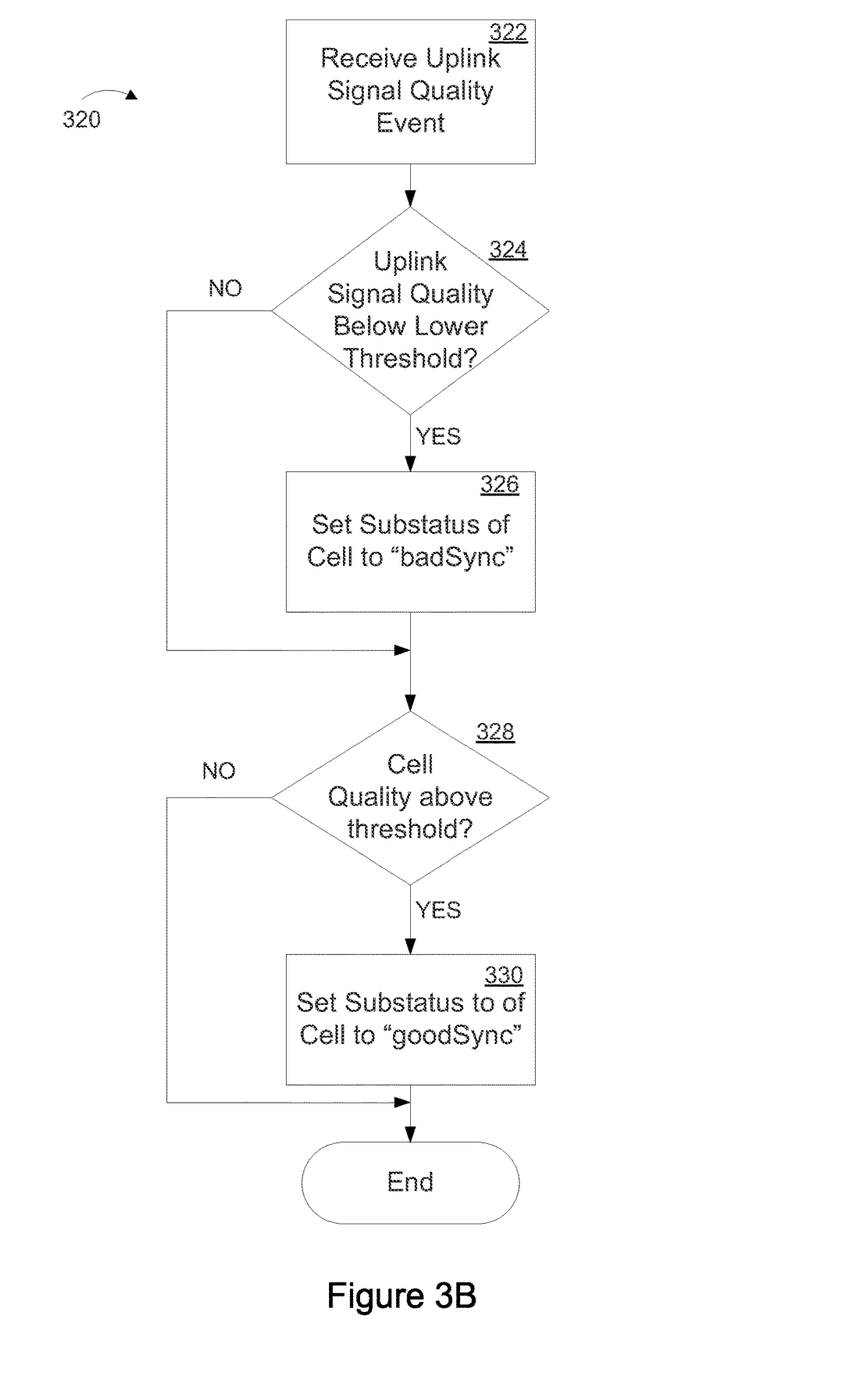

For a link that is inSync, monitoring of the uplink signal quality can be used to determine whether a cell in the active set is a good candidate for being a serving cell. Referring to FIG. 3B, for a cell with a status of "inSync", if the uplink signal quality for a cell (e.g., cell 206b) drops below a certain (lower) threshold for a certain amount of time (block 324), an RL_DEGRADE event may be communicated by the cell 206b to the RNC 204. In this regard, the threshold is sufficiently low to avoid or reduce hysteresis. The RL_DEGRADE event can result is a sub-status of the cell being set to "badSync", designating the cell as not a viable candidate for being a serving cell but still retaining it in the active set. The generation of the RL_DEGRADE event may require that the uplink signal quality remain below the lower threshold for a predetermined length of time (e.g., 200 milliseconds). In one embodiment, the uplink signal quality is measured as the signal-to-interference ratio. In other embodiments, other parameters may be used to measure signal quality. For example, the uplink signal quality may be measured based on absolute signal-level bit error rate, a false alarm probability, the downlink throughput, HARQ retransmission rate, and the like.

Conversely, if the uplink signal quality for a cell (e.g., cell 206d) rises above a certain (upper) threshold (block 328), an RL_IMPROVE event may be communicated by the cell 206d to the RNC 204. In this regard, the threshold is sufficiently high to avoid hysteresis. The RL_IMPROVE event can result in the sub-status of the cell being set to "goodSync", designating the cell as a viable candidate for being a serving cell. Further, the lower threshold for the RL_DEGRADE event and the upper threshold for the RL_IMPROVE event are sufficiently separated to avoid hysteresis and too-frequent changes in the serving cell. Further, as with the RL_DEGRADE event, the generation of the RL_IMPROVE event may require that the uplink signal quality remain above the upper threshold for a predetermined length of time.

As illustrated in FIG. 2, some cells may not report any events to the RNC 204. For example, in FIG. 2, there is no link illustrated between cell 206c and the RNC 204. This should not be interpreted to mean that there is no communication between the cell 206c and the RNC 204. Those skilled in the art will understand that normal communication between the cell 206c and an RNC, such as RNC 204, will occur. Thus, the links between the cells and the RNC 204 illustrated in FIG. 2 represent only the communication of events, such as RL_IMPROVE and RL_DEGRADE, to the RNC.

It may also be possible to convey the uplink SNR on the cells via other mechanisms such as multiple RL_RESTORE/RL_FAILURE messages or modification of the messages to include SNR, or periodic reporting of these messages without using a complex state machine. In alternate embodiments, it may be possible for the RNC to periodically or periodically query the health of the uplink from all cells in active set and autonomously make a decision to change the serving cell for each UE.

Figure 4:
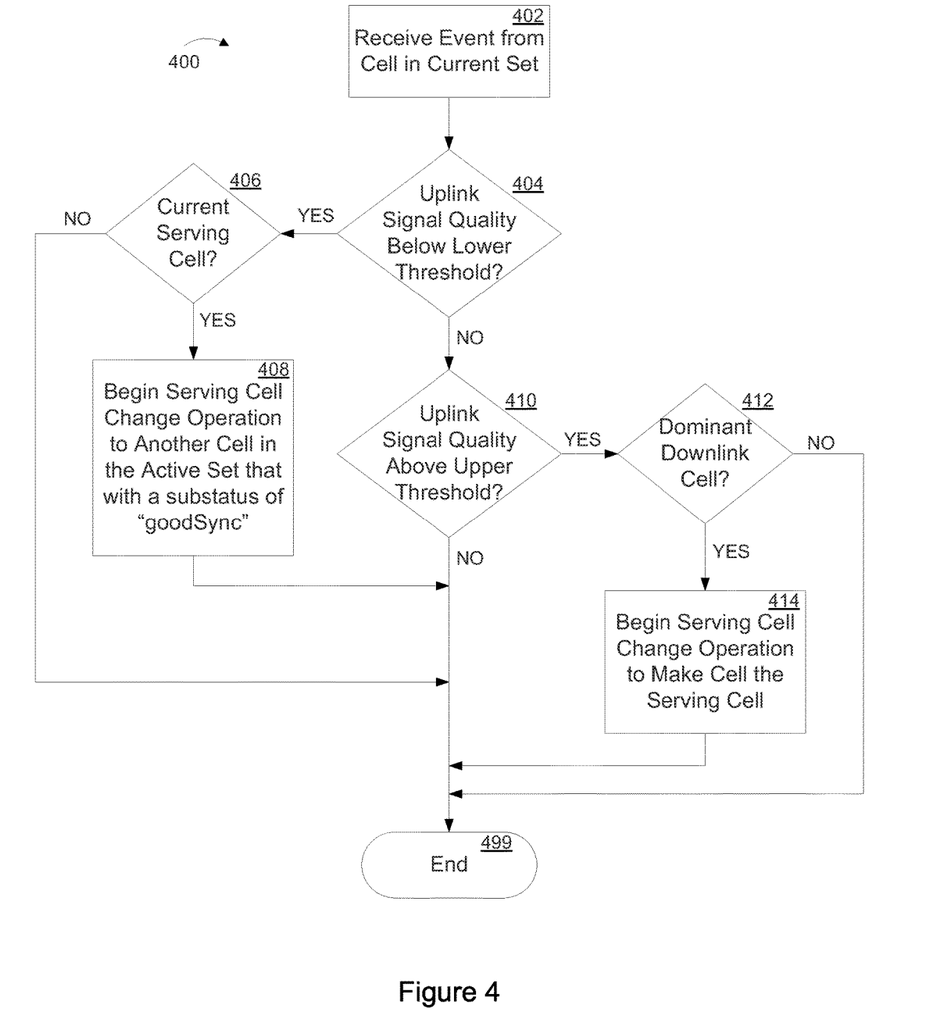
FIG. 4 illustrates an example method in accordance with certain embodiments.

The RNC uses the event notifications to keep track of which cells have an uplink signal of sufficient quality. Additionally, the RNC uses the event notifications to trigger change in the serving cell. Referring now to FIG. 4, the use of the event notifications by the RNC 204 is illustrated.

The method 400 begins with the receipt of an event notification by the RNC 204 from one of the cells in the active set of the UE 208 (block 402) or a UE request for serving cell change. As noted above, the event notifications may be sent by the cells in the active set when the signal quality satisfies a certain threshold. At block 404, if the event notification indicates that the uplink signal quality has been below the lower threshold for a period of time (RL_DEGRADE), the RNC 204 determines if the cell reporting the event is the current serving cell (block 406). If the cell reporting the event is not the current serving cell, the RNC 204 keeps track of the cell as having insufficient uplink signal quality, but no change in serving cell is made. On the other hand, if the cell reporting the event is the current serving cell, the RNC 204 initiates a serving cell change operation (block 408) to another cell in the active set that meets the uplink condition. The selection of the new serving cell may be based, in part, on knowledge of the uplink signal quality of the other cells in the active set of the UE 208.

Returning to block 404, if the event notification is not an RL_DEGRADE, and instead, at block 410, the event notification indicates that the uplink signal quality of the cell reporting the event has been above the upper threshold for a period of time (RL_IMPROVE), the RNC determines if the cell reporting the event is cell in the active set with the dominant downlink (block 412). If the cell reporting the event is not the dominant downlink cell, the RNC 204 keeps track of the cell as having sufficient uplink signal quality, but no change in serving cell is made. On the other hand, if the cell reporting the event is the current serving cell, the RNC 204 initiates a serving cell change operation to make the cell reporting the event the serving cell (block 414).

Figure 5:
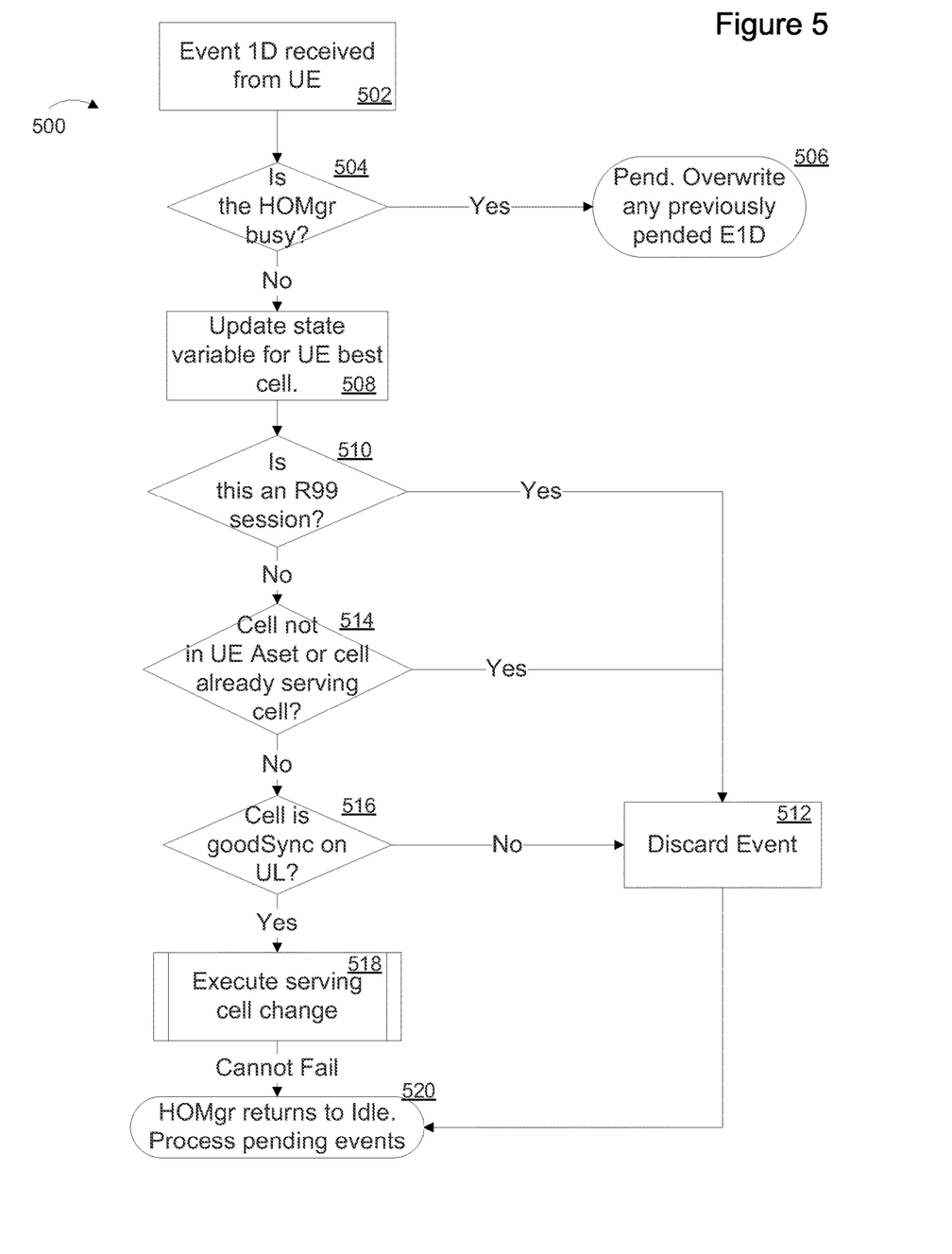
FIG. 5 illustrates an example method in accordance with certain embodiments.

These mechanisms can even be used in conjunction with the UE reporting of Events 1A, 1C, 1D and the like. In one embodiment, upon reception of event 1D from the UE, the RNC can check if the newly reported cell meets the uplink condition prior to executing a serving cell change. In this regard, FIG. 5 illustrates an example method. Upon receipt of an Event 1D from the UE (block 502) indicating that the cell identified as the best cell has changed, the RNC checks to see if the hand-off manager is busy (block 504). If the hand-off manager is busy, the RNC overwrites any previous Event 1D (block 506). Otherwise, the RNC, or the hand-off manager of the RNC, updates the state variable for the UE best cell (block 508) to identify the cell identified in the Event 1D.

If the current session for the UE is an R99 session (block 510), the Event 1D is discarded (block 512). Further, if the cell identified in the Event 1D is not in the active set of the UE (block 514), the Event 1D is discarded. Similarly, if the cell identified in the Event 1D is already the serving cell for the UE (block 514), the Event 1D is discarded (block 512). Also, if the cell identified in the Event 1D is currently designated with a sub-status of "goodSync" (block 516), the Event 1D is discarded (block 512).

If the Event 1D is not discarded for any of the reasons noted above, the hand-off manager executes a serving cell change to make the cell identified in the Event 1D the serving cell for the UE (block 518), and the hand-off manager returns to idle and awaits further event notifications (block 520).

Thus, the receipt of RL_DEGRADE and RL_IMPROVE event notifications allows the RNC 204 to keep track of which cells have a sufficient uplink signal quality and provides the RNC 204 with triggers for a serving cell change operation. Thus, sufficient uplink signal quality is assured.

Figure 6:
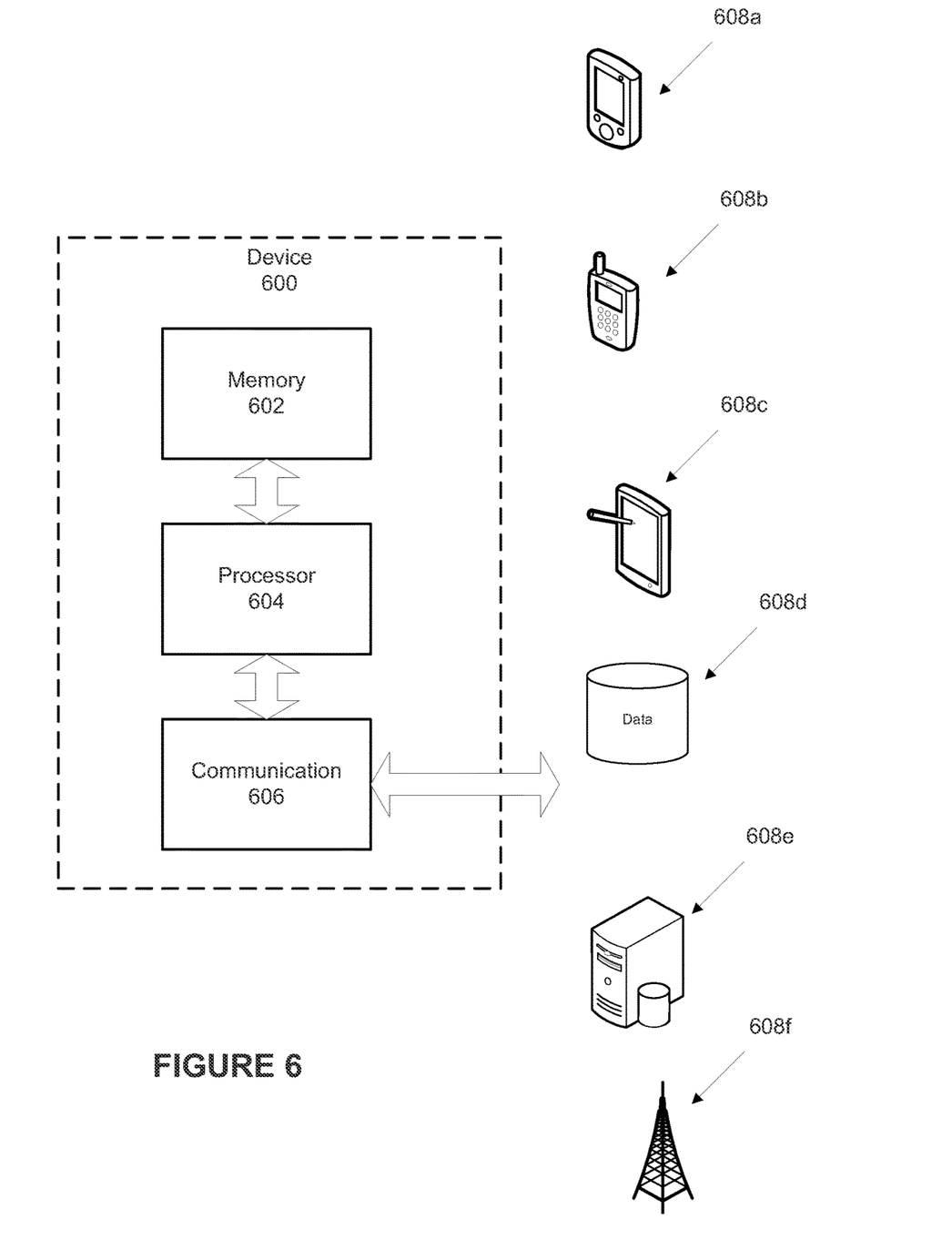
FIG. 6 illustrates a block diagram of an example device for implementing certain embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 6 illustrates a block diagram of a device 600 within which the various embodiments of the present invention may be implemented. The device 600 comprises at least one processor 604 and/or controller, at least one memory 602 unit that is in communication with the processor 604, and at least one communication unit 606 that enables the exchange of data and information, directly or indirectly, with other entities, devices and networks 608a to 608f. For example, the device 600 may be in communication with mobile devices 608a, 608b, 608c, with a database 608d, a server 608e and a radio node 608f. The communication unit 606 may provide wired and/or wireless communication capabilities, through communication link 610, in accordance with one or more communication protocols and, therefore, it may comprise the proper transmitter/receiver antennas, circuitry and ports, as well as the encoding/decoding capabilities that may be necessary for proper transmission and/or reception of data and other information. The exemplary device 600 that is depicted in FIG. 6 may be integrated as part of the various entities that are depicted in FIGS. 1-5. The device 600 that is depicted in FIG. 6 may reside as a separate component within or outside the above-noted entities that are depicted in FIGS. 1-5.

While various embodiments of the present invention have been described above for a WCDMA UMTS system, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

Furthermore, embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

What is claimed is:

1. A method, comprising:
receiving an event notification from a cell in a currently active set of cells for a user equipment, the event notification indicating an uplink signal quality from the user equipment to the cell;
designating the cell as being a viable candidate to be a serving cell based on the event notification, wherein the cell is designated as not being a viable candidate based on the event notification indicating that the uplink signal quality is below a lower threshold for a first predetermined amount of time and wherein the cell is designated as being a viable candidate to be a serving cell based on the event notification indicating that the uplink signal quality is above an upper threshold for a second predetermined amount of time, wherein the currently active set of cells for the user equipment comprises a plurality of cells;
querying the uplink signal quality of all cells in the currently active set of cells for the user equipment; and
autonomously changing the serving cell for the user equipment based on the uplink signal quality of all cells in the currently active set of cells for the user equipment.

2. The method of claim 1, further comprising:
initiating a serving cell change operation when the cell is a current serving cell and the cell is designated as not being a viable candidate to be the serving cell.

3. The method of claim 1, further comprising:
initiating a serving cell change operation to make the cell a serving cell based on the cell being designated a viable candidate to be the serving cell.

4. The method of claim 1, wherein the event notification is received by a radio network controller.

5. The method of claim 1, wherein the cell is a cellular node of a core network.

6. The method of claim 1, wherein the cell is a node of a small cell network.

7. The method of claim 1, wherein uplink signal quality includes signal-to-interference ratio.

8. The method of claim 1, wherein the upper threshold and the lower threshold are dynamically determined in accordance with an algorithm or variable parameters.

9. A method, comprising:
receiving an event notification from a cell in a currently active set of cells for a user equipment, the event notification indicating an uplink signal quality from the user equipment to the cell;
designating the cell as being a viable candidate to be a serving cell based on the event notification, wherein the cell is designated as not being a viable candidate based on the event notification indicating that the uplink signal quality is below a lower threshold for a first predetermined amount of time and wherein the cell is designated as being a viable candidate to be a serving cell based on the event notification indicating that the uplink signal quality is above an upper threshold for a second predetermined amount of time;
performing an initial synchronization when a new radio link is configured;
setting a state of the cell to an in-synchronization state for the user equipment based upon a satisfactory uplink signal quality between the cell and the user equipment;
including the cell in the currently active set of cells for the user equipment;
monitoring the uplink signal quality between the cell and the user equipment;
changing the state of the cell to an out-of-synchronization state if the uplink signal quality for the cell falls below the lower threshold for the first predetermined amount of time;
removing the cell from the currently active set of cells for the user equipment;
continuing to monitor the uplink signal quality between the cell and the user equipment;
changing the state of the cell back to the in-synchronization state if the uplink signal quality for the cell rises above the upper threshold for the second predetermined amount of time; and
restoring the cell to the currently active set of cells for the user equipment.

10. A method, comprising:
- receiving an event notification from a cell in a currently active set of cells for a user equipment, the event notification indicating an uplink signal quality from the user equipment to the cell;
- designating the cell as being a viable candidate to be a serving cell based on the event notification, wherein the cell is designated as not being a viable candidate based on the event notification indicating that the uplink signal quality is below a lower threshold for a first predetermined amount of time and wherein the cell is designated as being a viable candidate to be a serving cell based on the event notification indicating that the uplink signal quality is above an upper threshold for a second predetermined amount of time;
- performing an initial synchronization when a new radio link is configured;
- setting a state of the cell to an in-synchronization state for the user equipment based upon a satisfactory uplink signal quality between the cell and the user equipment;
- including the cell in the currently active set of cells for the user equipment;
- monitoring the uplink signal quality between the cell and the user equipment;
- changing the state of the cell to a bad synchronization state if the uplink signal quality for the cell falls below the lower threshold; and
- designating the cell as not being a viable candidate to be a serving cell, but retaining the cell in the currently active set of cells for the user equipment.

11. The method of claim 10, further comprising:
- continuing to monitor the uplink signal quality between the cell and the user equipment; changing the state of the cell to a good synchronization state if the uplink signal quality for the cell rises above the upper threshold; and
- designating the cell as being a viable candidate to be a serving cell.

12. A method, comprising:
- receiving an event notification from a cell in a currently active set of cells for a user equipment, the event notification indicating that an uplink signal quality from the user equipment to the cell has satisfied a threshold;
- determining if the event notification indicates that the uplink signal quality has been below a lower threshold for a predetermined amount of time;
- determining if the cell reporting the event notification is a serving cell for the user equipment;
- initiating a serving cell change if the event notification indicates that the uplink signal quality has been below the lower threshold for the predetermined amount of time and the cell reporting the event notification is the serving cell; and
- storing an indication that the cell reporting the event notification has insufficient uplink signal quality to be the serving cell if the event notification indicates that the uplink signal quality has been below a lower threshold for the predetermined amount of time and the cell reporting the event notification is not the serving cell.

13. The method of claim 12, further comprising selecting a new cell to be the serving cell based on uplink signal quality of other cells in the currently active set of cells for the user equipment.

14. The method of claim 12, wherein if the event notification does not indicate that the uplink signal quality has been below the lower threshold for the predetermined amount of time, the method further comprising:
- determining if the event notification indicates that the uplink signal quality has been above an upper threshold for a predetermined amount of time;
- determining if the cell reporting the event notification is a cell having a dominant downlink signal for the user equipment among the cells in the currently active set of cells for the user equipment;
- initiating a serving cell change to make the cell reporting the event notification the serving cell if the event notification indicates that the uplink signal quality has been above the upper threshold for the predetermined amount of time and the cell reporting the event notification has the dominant downlink signal for the user equipment among the cells in the currently active set of cells for the user equipment; and
- storing an indication that the cell reporting the event notification has sufficient uplink signal quality to be the serving cell if the event notification indicates that the uplink signal quality has been below the upper threshold for the predetermined amount of time, but the cell reporting the event notification does not have the dominant downlink signal for the user equipment among the cells in the currently active set of cells for the user equipment.

15. An apparatus, comprising:
- a processor; and
- a memory including computer program code, the memory and the computer program code configured to, with the processor, cause the apparatus to perform at least the following:
  - receive an event notification from a cell in a currently active set of cells for a user equipment, the event notification indicating that an uplink signal quality from the user equipment to the cell has satisfied a threshold;
  - determine if the event notification indicates that the uplink signal quality has been below a lower threshold for a predetermined amount of time;
  - determine if the cell reporting the event notification is a serving cell for the user equipment;
  - initiate a serving cell change if the event notification indicates that the uplink signal quality has been below the lower threshold for the predetermined amount of time and the cell reporting the event notification is the serving cell; and
  - store an indication that the cell reporting the event notification has insufficient uplink signal quality to be the serving cell if the event notification indicates that the uplink signal quality has been below the lower threshold for the predetermined amount of time and the cell reporting the event notification is not the serving cell.

16. The apparatus of claim 15, wherein the memory and the computer program code are further configured to, with the processor, cause the apparatus to select a new cell to be the serving cell based on uplink signal quality of other cells in the currently active set of cells for the user equipment.

17. The apparatus of claim 15, wherein if the event notification does not indicate that the uplink signal quality has been below the lower threshold for the predetermined amount of time, the memory and the computer program code are further configured to, with the processor, cause the apparatus to perform at least the following:

determine if the event notification indicates that the uplink signal quality has been above an upper threshold for a predetermined amount of time;

determine if the cell reporting the event notification is a cell having a dominant downlink signal for the user equipment among the cells in the currently active set of cells for the user equipment;

initiate a serving cell change to make the cell reporting the event notification the serving cell if the event notification indicates that the uplink signal quality has been above the upper threshold for the predetermined amount of time and the cell reporting the event notification has the dominant downlink signal for the user equipment among the cells in the currently active set of cells for the user equipment; and store an indication that the cell reporting the event notification has sufficient uplink signal quality to be the serving cell if the event notification indicates that the uplink signal quality has been below the upper threshold for the predetermined amount of time, but the cell reporting the event notification does not have the dominant downlink signal for the user equipment among the cells in the currently active set of cells for the user equipment.

* * * * *